(12) United States Patent
Chapin

(10) Patent No.: US 11,554,750 B2
(45) Date of Patent: Jan. 17, 2023

(54) MULTIFACTOR AUTHENTICATION FOR VEHICLE OPERATION

(71) Applicant: CAPITAL ONE SERVICES, LLC, McLean, VA (US)

(72) Inventor: Ann Claudia Chapin, Powhatan, VA (US)

(73) Assignee: Capital One Services, LLC, McLean, VA (US)

( * ) Notice: Subject to any disclaimer, the term of this patent is extended or adjusted under 35 U.S.C. 154(b) by 621 days.

(21) Appl. No.: 16/199,101

(22) Filed: Nov. 23, 2018

(65) Prior Publication Data

US 2020/0108795 A1    Apr. 9, 2020

Related U.S. Application Data

(63) Continuation of application No. 16/152,962, filed on Oct. 5, 2018, now Pat. No. 10,384,648.

(51) Int. Cl.

| | |
|---|---|
| *B60R 25/25* | (2013.01) |
| *B60R 25/24* | (2013.01) |
| *B60R 25/102* | (2013.01) |
| *G05D 1/00* | (2006.01) |
| *G05D 1/02* | (2020.01) |
| *B60R 25/20* | (2013.01) |
| *G10L 17/06* | (2013.01) |
| *B60R 25/23* | (2013.01) |
| *G10L 17/00* | (2013.01) |

(Continued)

(52) U.S. Cl.
CPC .......... *B60R 25/257* (2013.01); *B60R 25/102* (2013.01); *B60R 25/2009* (2013.01); *B60R 25/23* (2013.01); *B60R 25/24* (2013.01); *G05D 1/0061* (2013.01); *G05D 1/0212* (2013.01); *G06V 40/172* (2022.01); *G10L 17/00* (2013.01); *G10L 17/06* (2013.01); *B60R 2025/1016* (2013.01)

(58) Field of Classification Search
CPC ............ B60K 2350/1004; B60K 35/00; B60K 2350/1024; B60K 2350/1028; B60K 37/06; B60K 2350/1008; B60K 2350/1052

See application file for complete search history.

(56) References Cited

U.S. PATENT DOCUMENTS 6,009,355 A * 12/1999 Obradovich .......... B60R 25/042
                                                      701/1
6,163,251 A * 12/2000 Escareno ............... B60R 25/102
                                                      340/5.31

(Continued)

FOREIGN PATENT DOCUMENTS

KR     20040045631 A  *  6/2004
WO     WO-2007095026 A2 *  8/2007 ............. A61B 5/145

*Primary Examiner* — Redhwan K Mawari
(74) *Attorney, Agent, or Firm* — Perkins Coie LLP

(57) ABSTRACT

A system for limiting vehicle operation is disclosed. The system may comprise one or more memory units for storing instructions and one or more processors configured to execute the instructions to perform operations. The operations may comprise determining that a key device is inside the vehicle; performing an authentication; setting the vehicle in a first vehicle mode; starting the vehicle based on the determination and the first authentication; and limiting vehicle operation based on the first vehicle mode.

19 Claims, 13 Drawing Sheets

(51) Int. Cl.
*G06V 40/16* (2022.01)
*B60R 25/10* (2013.01)

(56) References Cited

U.S. PATENT DOCUMENTS

| | | | | | |
|---|---|---|---|---|---|
| 6,518,889 | B2* | 2/2003 | Schlager | ............ | G08B 13/1427 |
| | | | | | 340/573.1 |
| 8,467,770 | B1* | 6/2013 | Ben Ayed | ............... | G06F 21/35 |
| | | | | | 455/411 |
| 9,365,188 | B1* | 6/2016 | Penilla | ............... | G06Q 30/0643 |
| 2001/0020202 | A1* | 9/2001 | Obradovich | ........... | B60K 37/06 |
| | | | | | 701/487 |
| 2010/0042669 | A1* | 2/2010 | Cohen | .................... | G06Q 10/00 |
| | | | | | 709/201 |
| 2010/0235026 | A1* | 9/2010 | Shimizu | ................ | B60R 25/255 |
| | | | | | 180/65.265 |
| 2011/0153118 | A1* | 6/2011 | Lim | .......................... | G06F 7/00 |
| | | | | | 701/2 |
| 2014/0114504 | A1* | 4/2014 | Yamashita | ................ | G06F 7/00 |
| | | | | | 701/2 |
| 2014/0156104 | A1* | 6/2014 | Healey | ..................... | G07C 5/00 |
| | | | | | 701/1 |
| 2014/0306799 | A1* | 10/2014 | Ricci | ..................... | G01C 21/26 |
| | | | | | 340/5.83 |
| 2014/0306826 | A1* | 10/2014 | Ricci | ..................... | G01C 21/26 |
| | | | | | 340/573.1 |
| 2016/0104034 | A1* | 4/2016 | Wilder | ................. | G06V 10/945 |
| | | | | | 382/118 |
| 2018/0060552 | A1* | 3/2018 | Pellom | .................... | G06F 21/32 |

* cited by examiner

MULTIFACTOR AUTHENTICATION FOR VEHICLE OPERATION

RELATED APPLICATIONS

This application is a continuation of U.S. patent application Ser. No. 16/152,962 filed on Oct. 5, 2018, which is hereby incorporated by reference in the present application.

BACKGROUND

Conventional systems and methods to authenticate a user for vehicle operation typically consist of a single authentication process using a key device. For example, any user with a vehicle key device may start and operate a vehicle. To start a vehicle, a user may simply need to insert a traditional key into an ignition mechanism or place a wireless key device inside the vehicle. A user may insert a Passive Anti-Theft System (PATS) key with a chip containing a code into an ignition mechanism to start a vehicle. These conventional systems suffer from several deficiencies.

For example, conventional systems and methods are prone to carjacking. As news reports demonstrate, carjackings are becoming more common. Situations include cars stolen when a driver leaves a key device inside a car while pumping gasoline at a gas station. In this situation, a carjacker may be able to rush into a vehicle, start the vehicle, and drive away. Further, conventional systems and methods may leave drivers vulnerable to a carjacking in which a carjacker enters a vehicle, whether or not the engine is running, and coerces an owner to begin driving.

Further, conventional system and methods for vehicle authentication (e.g., PATS keys) may be unable to effectively limit vehicle operations for a temporary user or other authorized user. A vehicle owner may wish to limit vehicle operations when allowing a new driver, a child, or another inexperienced driver to borrow a vehicle, or when valet parking. However, conventional systems may be unable to limit vehicle speed or confine a vehicle to a specific geographic area.

In addition, conventional systems may be unable to provide data associated with the vehicle to remote devices. For example, conventional authentication systems may be unable to transmit a vehicle location, a vehicle speed, or a vehicle condition to a remote device. Conventional systems may be unable to notify an emergency system.

Some solutions to the problems of conventional systems have been proposed. For example, some vehicle systems may be configured to require a passcode to start. The passcode may be, for example, a valet passcode. Upon entry of the valet passcode before starting a vehicle, a vehicle may enter a valet mode in which vehicle speed is limited.

However, such existing systems may include just two vehicle modes: an unrestricted mode and a valet mode. Further, such systems may not be dynamic, i.e. a driver may be unable to alter the vehicle mode while the vehicle is running. Further, a user may not have control over the restriction criteria associated with the vehicle mode, e.g., the maximum vehicle speed. In addition, in a carjacking or another emergency situation, it may not be possible to set a restricted vehicle mode without being observed by other vehicle occupants, such as a carjacker. Further, existing solutions may not include processes which are more secure than simple passcodes.

Therefore, in view of the shortcomings and problems with existing methods, there is a need for improved systems and methods providing multifactor authentication for vehicle operation to provide greater security, offer multiple vehicle operation and authentication methods, and limit vehicle operations in multiple, customizable ways.

SUMMARY

The disclosed embodiments provide methods and systems for limiting vehicle operations using multifactor authentication, customizable vehicle modes, vehicle monitoring, a remote response system, and systems to control vehicle operations. Thus, the unconventional disclosed embodiments provide enhancements to controlling vehicle ignition and operation. The disclosed systems and methods are implemented using a combination of conventional hardware and software as well as specialized hardware and software, such as a machine constructed and/or programmed specifically for performing functions associated with the disclosed method steps.

Consistent with the present embodiments, a system for limiting vehicle operation comprising one or more processors and one or more memory units is disclosed. The system may be configured to determine that a key device is inside the vehicle and perform an authentication process. The authentication process may include receiving a biometric, validating the biometric, and identifying a vehicle mode corresponding to the validated biometric. The system may include authentication processes. The system may be configured to set the vehicle in the vehicle mode. In some embodiments, the system is configured to start the vehicle based on the determination and the authentication. The system may be configured to limit vehicle operation based on the vehicle mode. As an example, based on the vehicle mode, the system may limit vehicle operation by performing at least one of setting a maximum vehicle speed or disabling the vehicle.

Consistent with the present embodiments, a method for limiting vehicle operation is disclosed. The method may comprise determining that a key device is inside the vehicle and performing an authentication process. The authentication process may include receiving a biometric, validating the biometric, and identifying a vehicle mode corresponding to the validated biometric. The method may include other authentication processes. The method may include to setting the vehicle in the vehicle mode. In some embodiments, the method comprises starting the vehicle based on the determination and the authentication. The method may include limiting vehicle operation based on the vehicle mode. As an example, based on the vehicle mode, the method may comprise limiting vehicle operation by performing at least one of setting a maximum vehicle speed or disabling the vehicle.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve vehicle security and ability to manage or limit vehicle operations for multiple drivers. To achieve these unconventional improvements in managing vehicle operations, disclosed embodiments include one or more memory units for storing instructions and one or more processors configured to execute the instructions to perform operations. The operations may include determining that a key device is inside the vehicle; performing an authentication; setting the vehicle in a first vehicle mode; starting the vehicle based on the determination and the first authentication; and limiting vehicle operation based on the first vehicle mode. The authentication process may include receiving biometric data or other authentication data.

In the embodiments, a vehicle may be an automobile, a truck, a tractor, an agricultural vehicle, a construction vehicle, a cart, a motorcycle, a bicycle, a scooter, a plane, a helicopter, a boat, or other type of vehicle. In some embodiments, a vehicle may be an autonomous vehicle configured for various levels of automation. For example, a vehicle according to the embodiments may refer to a "hands on" vehicle, a "hands off" vehicle, an "eyes off" vehicle, a "mind off" vehicle, or a "steering wheel optional" vehicle following a classification system of the Society of Automotive Engineers. As one of skill in the art will appreciate, the embodiments may include other vehicle types.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
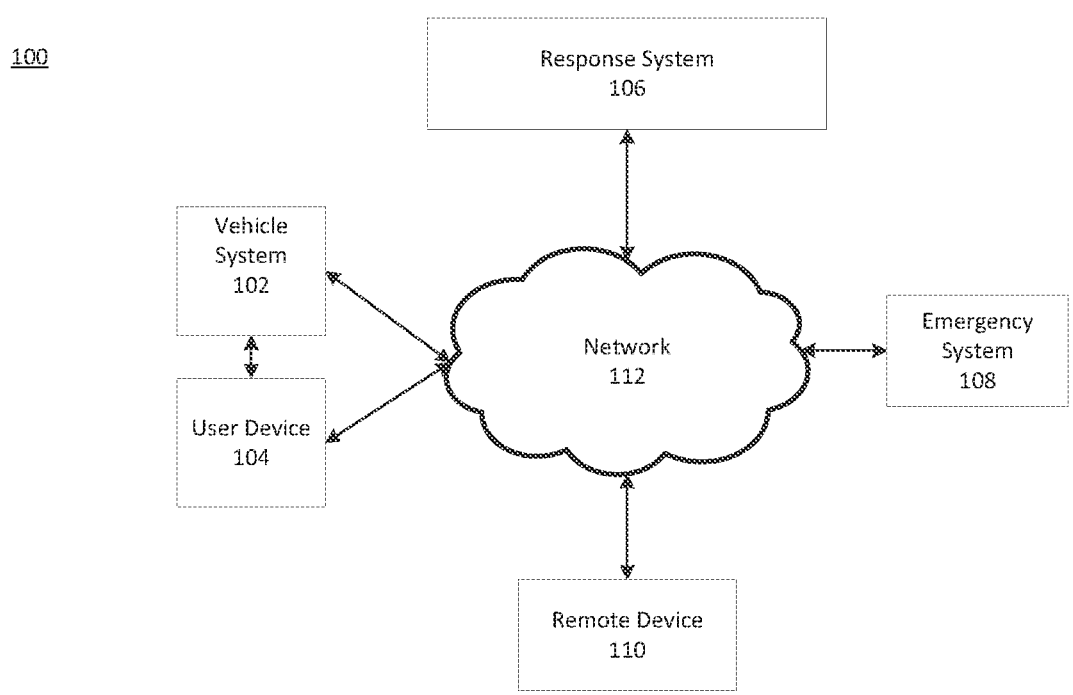
FIG. 1 is a diagram of an exemplary system for managing multifactor authentication for vehicle operation.

FIG. 1 is a diagram of exemplary system 100 for anaging multifactor authentication for vehicle operations. By providing unconventional systems and methods for ultifactor authentication for managing vehicle operations, the embodiments improve on conventional systems and methods. The embodiments provide greater security, offer multiple vehicle modes, use multiple authentication methods, and limits vehicle operations in multiple, customizable ways. System 100 may include a vehicle system 102, a user device 104, a response system 106, an emergency system 108, and a remote device 110. Components of system 100 may be connected to each other through a network 112. As shown in FIG. 1, user device 104 may be directly connected to vehicle system 102.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of vehicle systems, user devices, remote devices, response systems, emergency systems, or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Referring to FIG. 1, vehicle system 102 includes one or more memory units and one or more processors configured to perform operations consistent with disclosed embodiments. In some embodiments, system 100 may include hardware, software, and/or firmware modules. In some embodiments, some or all components of vehicle system 102 may be installed in a vehicle by a vehicle manufacturer. In some embodiments, some or all components of vehicle system 102 may be installed in a vehicle as after-market components by a vehicle dealer, a user, or another party. In some embodiments, vehicle system 102 is a stand-alone system communicatively coupled to built-in components of a vehicle. For example, in some embodiments, components of vehicle system 102 may connect to an on-board vehicle diagnostics port (OBD port) (not shown). Vehicle system 102 may be wirelessly connected to network 112 and may additionally be connected to mobile device 104. Vehicle system 102 is described in greater detail below.

As shown in FIG. 1, user device 104 may be a mobile device, such as a smartphone, a tablet, a personal computer, a wearable fitness tracker, a specialized device configured to perform methods according to disclosed embodiments, or the like. User device 104 includes one or more memory units and one or more processors configured to perform operations consistent with disclosed embodiments. An exemplary embodiment of user device 104 is described below in greater detail.

User device 104 may be connected to vehicle system 102. For example, user device 104 may connect to vehicle system 102 by at least one of a wireless connection or a wired connection. In some embodiments, the wireless connection includes at least one of a Wi-Fi connection, a Bluetooth connection, a Li-Fi connection, an optical wireless connection, a Near Field Communication (NFC) connection, or another wireless connection. In some embodiments, the wired connection includes at least one of a Universal Serial Bus (USB) connection, a Firewire connection, an ethernet connection, or another cable connection.

Referring again to FIG. 1, system 100 may include response system 106. Response system 106 may include a server, the server including processors and memory units, the processors configured to perform operations consistent with disclosed embodiments. In some embodiments, response system 106 includes a contact center staffed by human operators. In some embodiments, components of response system 106 may be hosted on a cloud service.

Still referring to FIG. 1, system 100 may include emergency system 108. Emergency system 108 may include a server including one or more memory units and one or more processors configured to perform operations consistent with disclosed embodiments. In some embodiments, emergency system 108 is a contact center configured to receive data (e.g., distress calls) and report to or dispatch emergency services. For example, emergency system 108 may report to or dispatch police, fire, ambulance services, or other emergency services. Emergency system 108 may be managed by a government agency, a nonprofit agency, a private organization, or another organization.

Referring again to FIG. 1, remote device 110 is located in a remote location from vehicle system 102. For example, vehicle system 102 may be located in a moving vehicle, and remote device 102 may be located in a building. Remote device 110 may be a mobile device, a smartphone, a tablet, a wearable fitness tracker, a personal computer, a specialized device configured to perform methods according to disclosed embodiments, or the like.

As shown in FIG. 1, at least one of vehicle system 102, user device 104, response system 106, emergency system 108, or remote device 110 may connect to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. In some embodiments, network 112 may be a secure network and require a password to access the network.

Figure 2:
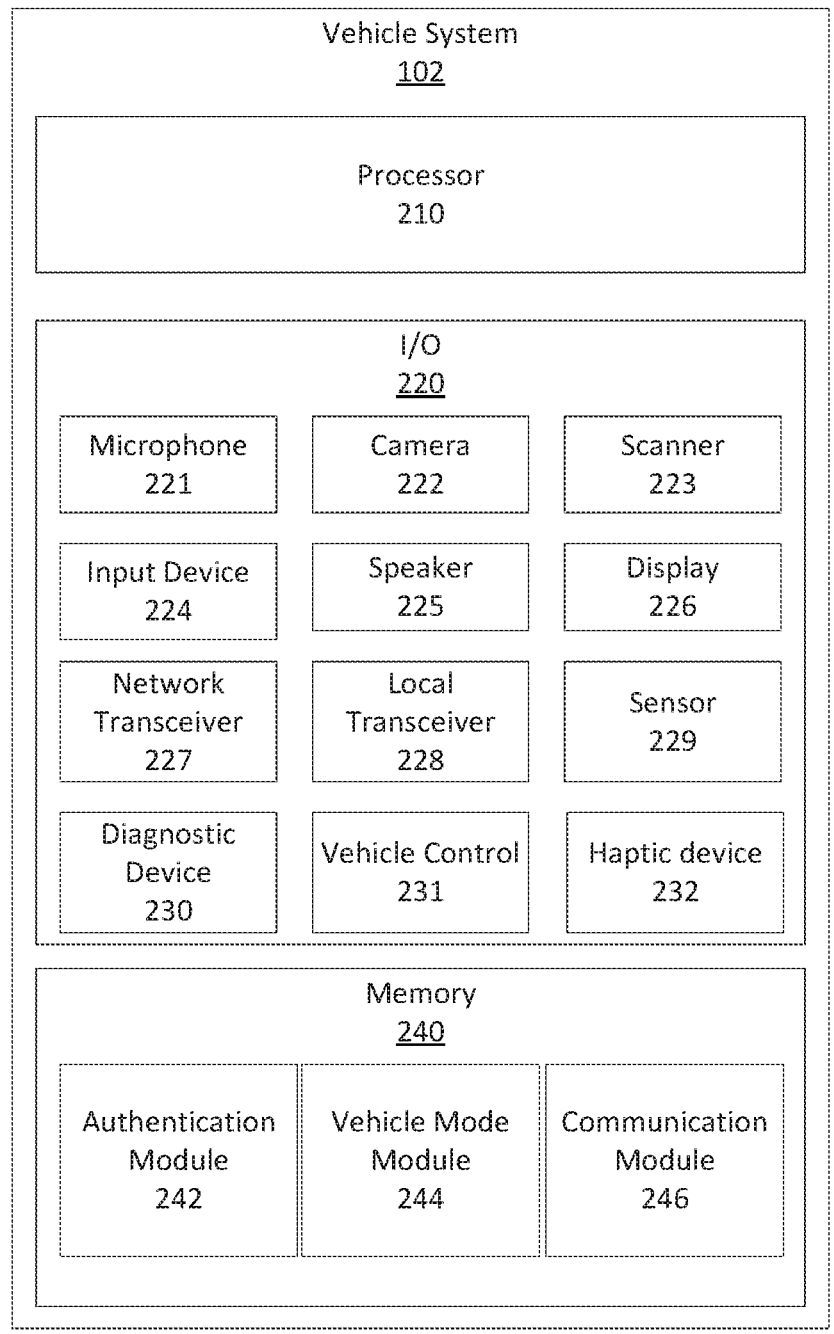
FIG. 2 is a diagram of an exemplary vehicle system, consistent with disclosed embodiments.

FIG. 2 is a diagram of exemplary vehicle system 102, consistent with disclosed embodiments. As depicted in FIG. 2, vehicle system 102 may include one or more processors 210, input output units (I/O devices) 220, and one or more memory units 240. FIG. 2 is an exemplary configuration of vehicle system 102. As will be appreciated by one skilled in the art, the components and arrangement of components included in vehicle system 102 may vary. For example, as compared to the depiction in FIG. 2, system 102 may include a larger or smaller number of processors 210, I/O devices 220, or memory units 240. In addition, vehicle system 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processors 210 may be known computing processors, including a microprocessor from the Snapdragon™ family manufactured by Qualcomm™ the Exynos™ family manufactured by Samsung™ or any of various processors manufactured by Apple™ Texas Instruments (TI)™, Hewlett Packard™ NVidia™ Qualcomm™ Samsung™, Panasonic™ or LG™, for example. Processor 210 may constitute a single-core or multiple-core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow vehicle system 102 to execute multiple processes simultaneously. One of ordinary skill in the art would understand that other types of processor arrangements could be implemented that provide for the capabilities disclosed herein. The disclosed embodiments are not limited to any type of processor(s) configured in vehicle system 102. Processor 210 may execute various instructions stored in memory 240 to perform various functions of the disclosed embodiments described in greater detail below. Processor 210 is configured to execute functions written in one or more known programming languages.

Referring again to FIG. 2, I/O devices 220 may include a microphone 221, a camera 222, a scanner 223, an input device 224, a speaker 225, a display 226, a network transceiver 227, a local transceiver 228, a sensor 229, a diagnostic device 230, a vehicle control 231, and a haptic device 232. I/O devices 220 may include other I/O devices, not depicted, that perform or assist in the performance of one or more processes consistent with disclosed embodiments. In some embodiments, some or all of I/O devices 220 may be mounted in a vehicle or on the exterior of a vehicle. In some embodiments, some or all of I/O devices 220 may be components of stand-alone devices communicatively coupled to other components of vehicle system 102.

As shown in FIG. 2, I/O devices 220 may include microphone 221, configured to receive an audio signal. In some embodiments, microphone 221 includes a microphone array. Microphone 221 may be mounted in or on a vehicle in a position to record speech of a vehicle occupant.

I/O devices 220 further include camera 222. Camera 222 may include a video camera, a still-image camera configured to take photographs, or a 3D image scanner. Camera 222 may include a lens and a digital imaging device such as a charge couple device (CCD) sensor. In some embodiments, camera 222 may be mounted in or on one of a dashboard, a mirror, or a ceiling of a vehicle, at a position suitable for capturing image data for facial recognition of a vehicle occupant. In some embodiments, camera 222 may be mounted on, for example, a door panel at a position suitable for capturing image data of a person located outside the vehicle.

In some embodiments, camera 222 includes a 3D scanner adapted to transmit and receive light signals for the detection of the 3D shape of an object. For example, camera 222 may be configured to detect the 3D shape using any suitable technique, for example, light coding, stereo imaging, time-of-flight, etc. In certain embodiments, camera 222 may include a Kinect™ device. In certain embodiments, camera 222 may be configured as a 3D camera with a light pattern transmitter (e.g., using infrared light). Camera 222 may be configured to project a pattern of light from the light transmitter onto objects, capture an image of the projected pattern of light, and then translate the distortions in the pattern into a 3D information (e.g., using the distortions to determine the distance of various points in the scene from the 3D camera by comparing the distortions to the known projected pattern).

Scanner 223 may include a retinal scanner, a fingerprint scanner, a hand scanner, or other biometric scanner, and may be configured to collect biometric data for user authentication processes. For example, scanner 223 may be a retinal scanner mounted on a rearview mirror or other position in a vehicle at a position suitable for scanning the retina of a driver of a vehicle.

Input device 224 may include at least one of a touchpad, a touch screen, a keyboard, a mouse, a button, a dial, a knob, a switch, or the like. As will be appreciated by one of skill in the art, input device 224 may be any device capable of receiving user inputs to perform or assist in performing methods consistent with disclosed embodiments. For example, input device 224 may be configured to assist in the performance of authentication processes by receiving passcodes.

In some embodiments, vehicle system 102 includes one or more speakers 225 configured to provide audio output. In some embodiments, speaker 225 includes an array of speakers located throughout the vehicle. Speaker 225 may be mounted in or on the vehicle, or may be a component of a standalone device communicatively coupled to other components of vehicle system 102.

In some embodiments, display 226 may include a light-emitting component, such as an LED or other component capable of providing a visible signal to a user. In some embodiments, display 226 includes at least one of a monitor, an LCD display, an LED display, a touch screen, a lamp, a projector, or another visual display. Display 226 may include a movable needle, and may include a vehicle condition indicator. For example, display 226 may include a fuel level indicator, a battery indicator, a vehicle service indicator, vehicle component temperature indicator, an oil level indicator, a tire pressure indicator, a seat belt usage indicator, or the like.

As shown in FIG. 2, I/O devices 220 may include network transceiver 227 and local transceiver 228. Network transceiver 227 is configured to connect to network 112. Network transceiver may include a transceiver configured to connect with at least one of any type of cellular data network, or at least one of a Wi-Fi transceiver, a Li-Fi transceiver, Near Field Communication (NFC) transceiver, a radio transceiver, an ultra-high frequency (UHF) transceiver, a Bluetooth transceiver, or other wireless transceiver.

Local transceiver 228 is configured to connect with a user device located in or near a vehicle. For example, local transceiver 228 may be configured to connect to user device 104 and/or a key device via at least one of a Bluetooth transceiver, Wi-Fi transceiver, a Li-Fi transceiver, Near Field Communication (NFC) transceiver, a radio transceiver, an ultra-high frequency (UHF) transceiver, an infrared transceiver, or other wireless transceiver. As one of skill in the art will appreciate, local transceiver 228 and network transceiver 227 may share components or may be components of the same device.

As shown in FIG. 2, I/O devices 220 may include one or more sensors 229. Sensor 229 may include at least one of a speed sensor, an accelerometer, a gyroscope, a braking sensor, a global positioning system (GPS) sensor, a vehicle acceleration sensor, a Light Detection And Ranging (LIDAR) sensor, or the like. Sensor 229 may also include a sensor configured to provide vehicle information, such as engine revolutions per minute (RPM), the state or gear of a transmission, throttle position, engine coolant temperature, engine noise, or other engine information. Sensor 229 may include one or more weight or force sensors configured to detect the presence of a person in a vehicle seat. The weight sensor may be further configured to provide an estimate of the weight of a person in the vehicle seat. In some embodiments, sensor 229 may also include at least one of a fuel level sensor, a battery life sensor, an oil level sensor, a temperature sensor, a smoke detector, a moisture sensor, an ambient pressure sensor, a seat belt sensor, or another vehicle condition sensor.

As shown in FIG. 2, I/O devices 220 may include diagnostic device 230. Diagnostic device 230 may include components of an on-board diagnostic (OBD) system configured for vehicle self-diagnostic and reporting capabilities. Diagnostic device 230 may include a digital output port configured to provide diagnostic codes or diagnostic indicators to other components of vehicle system 102. In some embodiments, diagnostic device 230 includes an OBD system configured for standard interfaces including, for example, OBD-I, OBD-II, European OBD (EOBD), Japanese OBD (JOBD), Australian Design Rule 79/01 and 79/02, or the like.

I/O devices 220 may include one or more vehicle control devices 231. Vehicle control device 231 includes at least one of an ignition control or other control capable of enabling or disabling a vehicle. Vehicle control device 231 may include at least one of a steering control device, a braking control device, an acceleration control device, or other vehicle control device configured to limit vehicle operations. In some embodiments, vehicle control device 231 may include components of an autonomous driving system configured to control the direction and speed of a vehicle.

As shown in FIG. 2, I/O devices 220 may include a haptic (i.e. tactile) device 232 configured to receive a user instruction signal and provide haptic feedback. In some embodiments, the intensity, duration, and pattern of the haptic feedback is based on the user instruction signal. In some embodiments, displaying or playing a notification includes providing haptic feedback.

Referring again to FIG. 2, vehicle system 102 includes memory 240 including one or more memory units. Memory 240 may be a volatile or non-volatile, magnetic, semiconductor, optical, removable, non-removable, or other type of storage device or tangible (i.e., non-transitory) computer-readable medium. Memory 240 may store one or more programs (modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs stored in memory 240 may be written in one or more programming or scripting languages. One or more of such software sections or modules of memory 240 can be integrated into a computer system, non-transitory computer-readable media, or existing communications software. The programs can also be implemented or replicated as firmware or circuit logic.

Memory 240 may include programs to authenticate a user, create or edit a user profile, determine a vehicle mode, set a vehicle mode, monitor vehicle operations, limit vehicle operations, send and receive data, display a message, play a message, perform an authentication process, create or edit a user profile, determine a vehicle mode, set a vehicle mode, and/or other functions consistent with disclosed embodiments.

As shown in FIG. 2, memory 240 may include an authentication module 242, a vehicle mode module 244, and a communications module 246. Memory 242 includes at least one of encrypted data or unencrypted data.

In some embodiments, authentication module 242 includes instructions that, when executed by processor 210, cause processor 210 to perform operations to authenticate a user, consistent with disclosed embodiments. For example, authentication module 242 may be configured to confirm the identity and/or authority of a driver to operate the vehicle. Authentication module is configured to receive authentication inputs and validate the authentication inputs. Authentication module 242 is configured to receive inputs from and send outputs to I/O devices 220 and to send data to and receive data from other modules of memory 240, including vehicle mode module 244 and communication module 246.

Authentication module 242 may include programs to determine that a key device is located inside a vehicle based on data received from I/O devices 220 while the engine of the vehicle is running or not running. In some embodiments, authentication module 242 is configured to continuously or periodically determine whether a key device is located inside a vehicle.

In some embodiments, authentication data are stored in authentication module 242. Authentication data may include, for example, user profile data, biometric data, pass code data, voice recognition data, image data, or other authentication data. In some embodiments, authentication data are stored in one or more remote databases, not depicted, and authentication module 242 includes programs and scripts to receive authentication data from the remote database. In some embodiments, the remote databases may be components of response system 106.

Authentication module 242 is configured to perform an authentication process. The authentication process may include initiating an authentication process; requesting authentication data; receiving authentication data; validating authentication data; and identifying a vehicle mode. Authentication module 242 may be configured to receive and validate a passcode or a password, to perform a voice recognition process, to identify a key phrase in an audio signal using, for example, speech recognition algorithms, to perform a facial recognition process, or to perform biometric-based verification processes. A key phrase may be a stored speech pattern.

In some embodiments, authentication module 242 is configured to receive authentication data from other sources. For example, authentication module 242 may transmit data to and receive data from at least one of user device 104, response system 106, or remote device 110 to perform steps of an authentication process. In some embodiments, the results of the remote authentication process may be received by authentication module 242.

As shown in FIG. 2, memory 240 may include vehicle mode module 244. Vehicle mode module 244 includes instructions that, when executed by processor 210, cause processor 210 to perform operations including receiving inputs from and sending outputs to input output devices 220, consistent with disclosed embodiments. Such operations may include monitoring functions and vehicle control functions.

Vehicle mode module 242 includes vehicle mode data and user data. Vehicle mode data may include a vehicle mode name and corresponding settings and parameters of the vehicle mode, consistent with disclosed embodiments. In some embodiments, vehicle mode data includes data to assist in vehicle monitoring functions, vehicle control functions, audio functions, and/or display functions. In some embodiments, vehicle mode data includes information to assist communications module 246.

In some embodiments, vehicle mode module includes at least one of an "unrestricted mode," a "restricted mode," an "emergency mode," a "supervised mode," a "erratic driver mode," and an "unresponsive driver mode." In some embodiments, before the vehicle is enabled for operation, vehicle system 102 conducts an authentication process, vehicle mode module 244 determines and sets the vehicle mode, and vehicle system 102 enables the vehicle for operation. In some embodiments, when the vehicle is operating in one vehicle mode, and vehicle mode module 244 may update the vehicle to a different vehicle mode.

In some embodiments, user data of vehicle mode module 244 includes user data associated with a user profile. User data may include a pointer to authentication data stored in authentication module 242 corresponding to a user. In some embodiments, user data may include a vehicle mode key phrase, a passcode, or other input data corresponding to a vehicle mode setting, consistent with disclosed embodiments. In some embodiments, vehicle mode module 244 receives user data from one of user device 104, response system 106, or remote device 110. In some embodiments, vehicle mode module 244 includes functions to create or edit a user profile and user data associated with a user profile.

In some embodiments, monitoring functions of vehicle mode module 244 include programs or scripts to monitor at least one of vehicle location, vehicle speed, engine information, braking information, or other vehicle condition. In some embodiments, monitoring functions include programs to monitor for hazard conditions (e.g., fire or flood). In some embodiments, vehicle mode module 244 may receive sensor data from sensor 229, diagnostic device 230, and/or user device 104, consistent with disclosed embodiments. For example, vehicle monitoring module 244 may receive GPS data from a GPS device and estimate a vehicle location. As another example, monitoring module 244 may receive speed data and determine whether a vehicle speed exceeds a predetermined threshold speed. As yet another example, monitoring module may receive a vehicle condition including at least one of a vehicle fuel level, an oil level, a battery level, a tire pressure, a temperature, a seat belt usage, or another vehicle condition. In some embodiments, monitoring module receives smoke detector data and/or temperature sensor data to detect the presence of fire within or outside a vehicle. In some embodiments, monitoring module receives smoke detector data to determine whether an occupant may be smoking (e.g., smoking a cigarette, cigar, vaping, or the like). In some embodiments, monitoring module receives moisture sensor data and/or an ambient pressure sensor data to determine that a vehicle may be fully or partially submerged in water (e.g., during a flood). As one of skill in the art will appreciate, monitoring functions may be configured for other operations to perform methods of the disclosed embodiments.

Consistent with disclosed embodiments, vehicle control functions of vehicle mode module 244 include programs and scripts to limit vehicle operations by controlling vehicle controls 231. For example, vehicle control functions may include functions to limit vehicle speed, enable or disable a vehicle for operation, or otherwise limit vehicle operations. Vehicle control functions may include instructions to set a vehicle in an autonomous driving mode and may further include instructions to travel to a destination in the autonomous driving mode. Vehicle control functions may include functions to simulate an engine failure. Vehicle control functions may include functions to control vehicle ignition to turn a vehicle on or off. In some embodiments, vehicle control functions include functions to control vehicle lights (e.g., emergency lights, headlights, interior lights, and the like). Vehicle control function may include functions to control vehicle locks, including door locks, trunk locks, child locks, storage compartment locks, and the like. As one of skill in the art will appreciate, vehicle mode module 244 may include other vehicle control functions to perform methods consistent with disclosed embodiments.

In some embodiments, vehicle mode module 244 includes functions to control I/O devices 220 to communicate with vehicle occupants. For example, vehicle mode module 244 causes information to be displayed on display 226. Vehicle mode module 244 may cause display 226 to display a notification from response center 106, emergency service 108, or remote user device 110. Vehicle mode module 244 may cause a vehicle condition indicator to display a false vehicle condition. In some embodiments, changing a display includes controlling a fuel level indicator to indicate that a fuel tank is empty when the fuel tank is not empty. In some embodiments, vehicle mode module may cause speaker 225 to play a message or display 226 to display a message. For example, speaker 225 or display 226 may warn a driver that the vehicle speed is at or near a maximum speed, that a vehicle is approaching a geographic boundary, or that a vehicle is approaching a distance threshold. As another example, speaker 225 or display 226 may inform a vehicle occupant that the vehicle is in a particular vehicle mode. As one of skill in the art will appreciate, vehicle mode module 244 may include other communication functions to perform methods consistent with disclosed embodiments.

Vehicle mode module 244 may include an unrestricted mode. A vehicle operating in an unrestricted mode operates without restriction on speed or location. A vehicle operator or driver who regularly operates a vehicle (e.g., a car or truck owner) may wish to use unrestricted mode as a default mode.

Vehicle mode module 244 may include one or more restricted modes. A vehicle operating in a restricted mode operates with limited vehicle operations. One may wish to set a vehicle in restricted mode when giving temporary access of a vehicle to another user (e.g., for valet parking, or someone who borrows a car). If a vehicle operating in restricted mode satisfies restriction criteria, vehicle mode module 244 may limit vehicle operations or send data to at least one of response system 106, emergency system 108, or remote device 110. In some embodiments, restriction criteria may include at least one of a maximum vehicle speed, a distance threshold, or a geographic boundary. Vehicle mode module 244 may limit vehicle operations by, for example, reducing speed and/or preventing further acceleration if a vehicle meets or exceeds a maximum vehicle speed. As another example, if a vehicle approaches a distance threshold or geographic boundary, vehicle mode module 244 may reduce vehicle speed and warn the vehicle occupants that the vehicle will be disabled. As yet another example, vehicle mode module 244 may switch a vehicle into an autonomous driving mode if restriction criteria are satisfied. In some embodiments, vehicle mode module 244 may determine that restriction criteria are satisfied and, once a vehicle stops, prevent the vehicle from moving further. For example, vehicle mode module 244 may determine that a vehicle has crossed a geographic boundary and, when a driver stops at a stop sign or red light, place the vehicle transmission in PARK. Consistent with disclosed embodiments, other methods of limiting vehicle operations are possible in a restricted mode.

Vehicle mode module 244 may include one or more emergency modes. An emergency mode is a specialized restricted mode. One may wish to set a vehicle in an emergency mode during, for example, a carjacking or kidnapping without alerting the carjacker or kidnapper that the vehicle mode is being set in an emergency mode. In some embodiments, a vehicle is not operating prior to being set in an emergency mode. For example, authentication module 242 may receive input data corresponding to an emergency vehicle mode during an authentication process and provide these data to vehicle mode module 244. For example, during an authentication process, vehicle mode module 244 may receive a pass code, a tap code, a voice signal including a key phrase, or other input data corresponding to an emergency mode. For example, the passcode "1234" may correspond to an unrestricted mode, while the passcode "4321" may correspond to an emergency mode. In this example, the authenticating user may set the vehicle in an emergency mode without alerting other vehicle occupants.

In some embodiments, the vehicle is operating in another mode, when vehicle mode module 244 updates the vehicle mode to an emergency mode. For example, the vehicle may be operating in an unrestricted mode and, consistent with disclosed embodiments, vehicle mode module 244 may receive and process continuous audio inputs from a microphone located inside a vehicle. In this example, a carjacker enters a vehicle with a weapon and an occupant says "please, please don't hurt me," which, for purposes of illustration, is an exemplary pre-defined key phrase corresponding to an emergency mode, i.e. an emergency phrase. Subsequently, vehicle mode module 244 may determine that the audio signal contains a match for the key phrase. Based on the determined match, vehicle mode module 244 may set the vehicle mode to the emergency mode. In some embodiments, vehicle mode module 244 sets a vehicle in the emergency mode upon receiving input data from a button, switch, dial, pedal, or other input device designed to be hidden from vehicle occupants. As one of skill in the art will appreciate, other exemplary scenarios are possible involving yet other means to set a vehicle mode in emergency mode without alerting vehicle occupants.

In some embodiments, a vehicle emergency mode includes instructions to send data to at least one of response system 106, emergency system 108, remote device 110 or other systems. The data may include at least one of a vehicle location, a vehicle speed, engine information, braking information, a vehicle condition, or a message that the vehicle is in an emergency mode. In some embodiments, a vehicle emergency mode includes instructions to cause a vehicle condition indicator to display a false vehicle condition. For example, display 226 may indicate that a vehicle fuel level is empty when, in reality, the vehicle fuel level is not empty. In some embodiments, a vehicle emergency mode includes functions to simulate an engine failure. For example, vehicle condition indicators may show errors or warnings on display 226, and vehicle control 231 may send signals to engine components to switch off and on or otherwise exhibit abnormal behavior, thereby simulating the appearance of an engine failure. A vehicle emergency mode may include still other limitations on vehicle operations, consistent with disclosed embodiments.

Vehicle mode module 244 may include one or more supervised modes. One may wish to set a vehicle in a supervised mode when, for example, lending a vehicle to a student driver, to someone unfamiliar with a geographic location, or to another inexperienced user. Supervised mode is a type of restricted mode with enhanced communication requirements or restriction criteria. For example, supervised mode may include instructions to provide continuous or frequent location updates to at least one of remote device 110 and/or response system 106. Supervised mode may include instructions to provide continuous or frequent vehicle speed updates to remote device 110 and/or response system 106. Supervised mode may include a plurality of geographic boundaries defining respective geographic areas, each area having a corresponding a maximum speed or other restriction criteria. For example, supervised mode may limit vehicle on highways or prevent vehicles from using highways by limiting vehicle operations.

Vehicle mode module 244 may include one or more "erratic driver" modes. An erratic driver mode is a specialized restricted mode. In an erratic driver mode, vehicle mode module 244 may determine whether a driver is driving in an erratic or aggressive driving pattern. For example, vehicle mode module 244 may perform an analysis of acceleration data, braking sensor data, speed data, or other data collected by vehicle monitoring functions, as disclosed below. Vehicle mode module 244 may use multivariate statistical methods to determine that a driver is driving in an erratic or aggressive driving pattern. An erratic or aggressive driving pattern may be characterized by rapid variations in speed and/or direction or by large variations in speed and/or direction in short time periods. Vehicle mode module 244 may compare real-time data to stored data to make the determination. In some embodiments, vehicle mode module 244 may send data to one of remote response system 106 or remote user device 110 based on the determination. Alternatively or additionally, vehicle mode module 244 may limit vehicle operations based on the determination.

Vehicle mode module 244 may include one or more "unresponsive driver" modes. An unresponsive mode is a specialized case of a restricted mode. In some embodiments, a vehicle operating in an unresponsive mode may operate unrestricted or with limited restrictions until vehicle monitoring functions determine that a driver is in an unresponsive state. The unresponsive state may be, for example, caused by one of falling asleep, having a heart attack, having a stroke, entering diabetic shock, losing consciousness, or having another health event. For example, vehicle mode module 244 may determine that a driver is in an unresponsive state based on image data from camera 221 and microphone data from microphone 220. In some embodiments, vehicle mode module 244 determines that a driver is in an unresponsive state based on data received from user device 104. For example, user device 104 may monitor heart rate, breathing, and motion to determine that a user is in an unresponsive state, then send a message to vehicle mode module 244, the message including information that a user is in an unresponsive state.

In some cases, a determination that a driver is in an unresponsive state may be triggered by an indication that the driver is intoxicated by displaying signs of intoxication, such as eyeball movements characteristic of intoxication, eye redness, uncoordinated body movements, slurred speech, or other signs of intoxication.

In some embodiments, vehicle mode module 244 may send data to one of remote response system 106, emergency system 108, or remote user device 110 based on a determination that a driver is in an unresponsive state. Alternatively or additionally, vehicle mode module 244 may limit vehicle operations based on the determination.

As one of skill in the art will appreciate, the vehicle modes described herein are exemplary only and not intended to limit the disclosure. Further, the vehicle modes described herein are not mutually exclusive and additional vehicle modes not described in detail may contain features of one or more of the vehicle modes described herein as well as additional features.

Referring again to FIG. 2, memory 240 may include communication module 246. Communication module 246 includes programs and scripts to connect with, for example, network 112 and/or user device 104. For example, communication module 246 may be configured to scan and detect a user device, and connect to the detected user device. Communication module includes protocols and communication standards to open and maintain connections via at least one of network transceiver 227 and local transceiver 228. Communication module 240 may include functions to connect to a cellular data network, a Wi-Fi network, a Bluetooth device, a Li-Fi network, an optical wireless network, a Near Field Communication (NFC) network, or other wireless connection. In some embodiments, communication module 240 include functions to connect to a device using at least one of a Universal Serial Bus (USB) connection, a Firewire connection, an ethernet connection, or another cable connection.

Figure 3:
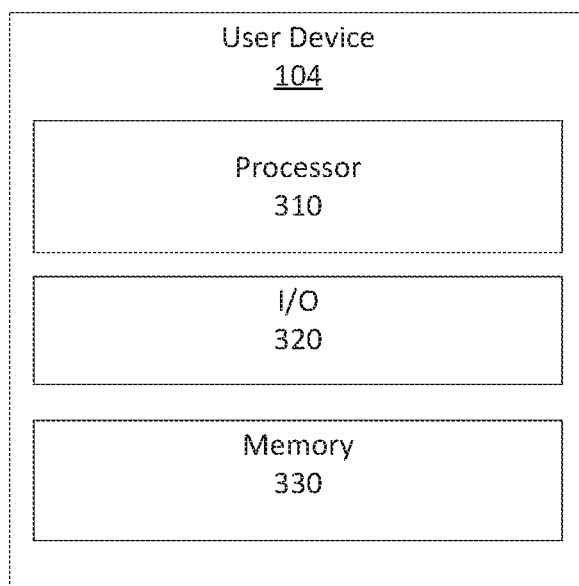
FIG. 3 is a diagram of an exemplary user device, consistent with disclosed embodiments.

FIG. 3 is a diagram of exemplary user device 104, consistent with disclosed embodiments. User device 104 may be a mobile device, a smartphone, a tablet, a personal computer, a specialized device configured to perform methods according to disclosed embodiments, or the like. As shown, user device 104 includes one or more processors 310, I/O devices 320, and one or more memory units 330.

Processors 310 may include known computing processors, such as described above. One of ordinary skill in the art would understand that other types of processor arrangements could be implemented that provide for the capabilities disclosed herein. The disclosed embodiments are not limited to any type of processor(s) configured in user device 104. Processor 310 may execute various instructions stored in memory 330 to perform various operations of the disclosed embodiments described in greater detail below. Processor 310 is configured to execute instructions written in one or more programming languages.

I/O devices 320 may include at least one of a display, an LED, a touchscreen, a keyboard, a mouse, a microphone, a speaker, a haptic device, a camera, a button, a dial, a switch, a knob, a GPS sensor, an accelerometer, a magnetometer, a transceiver, or another I/O device to perform methods of the disclosed embodiments. I/O devices 320 may be embedded components of user device 104 or standalone devices communicatively coupled to user device 104.

As shown in FIG. 3, user device 104 includes memory 330 including one or more memory units, as described above. One or more software sections or modules of memory 330 can be integrated into a computer system, non-transitory computer-readable media, or existing communications software. The programs, modules, or code can also be implemented or replicated as firmware or circuit logic.

Memory 330 may include programs to authenticate a user, create or edit a user profile, determine a vehicle mode, set a vehicle mode, monitor vehicle operations, limit vehicle operations, send and receive data, display a message, play a message, perform an authentication process, create or edit a user profile, determine a vehicle mode, set a vehicle mode, and/or other functions consistent with disclosed embodiments. In some embodiments, memory 330 includes one or more programs disclosed in reference to memory 240 of vehicle system 102.

Figure 4:
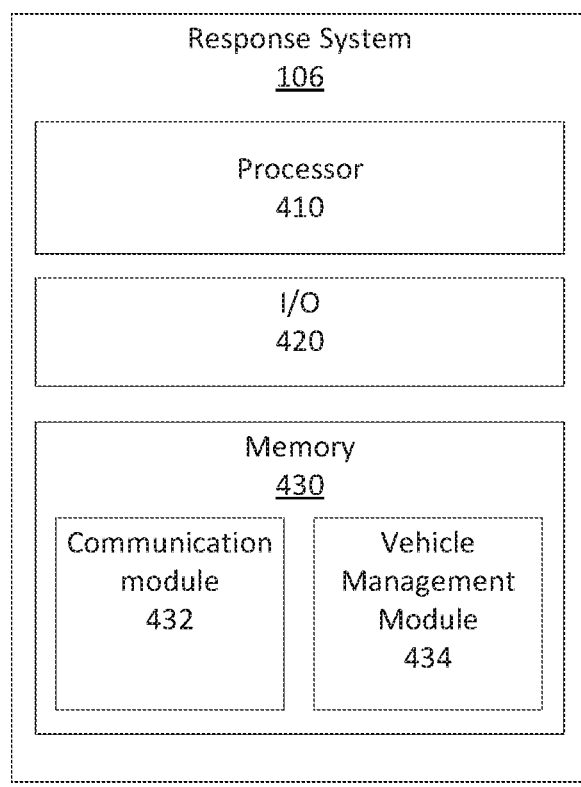
FIG. 4 is a diagram of an exemplary response system, consistent with disclosed embodiments.

FIG. 4 is a diagram of exemplary response system 106, consistent with disclosed embodiments. Response system 106 may include a processor 410, such as a server or other computer. As shown, response system 106 includes one or more processors 410, one or more I/O device 420, one or more memory units 430. In some embodiments, components of response system 106 may be hosted on a cloud service.

Processors 410 may include one or more known computing processors, as described above. One of ordinary skill in the art would understand that other types of processor arrangements could be implemented that provide for the capabilities disclosed herein. The disclosed embodiments are not limited to any type of processor(s) configured in response system 106. Processor 410 may execute various instructions stored in memory 430 to perform various functions of the disclosed embodiments described in greater detail below. Processor 410 is configured to execute functions written in one or more programming languages.

I/O devices 420 may include components to connect to network 112 and to send data to and receive data from at least one of vehicle system 102, user device 104, emergency system 108, or remote device 110. For example, I/O devices 430 may include at least one of a display, an LED, a router, a touchscreen, a keyboard, a microphone, a speaker, a haptic device, a camera, a button, a dial, a switch, a knob, a transceiver, or another I/O device to perform methods of the disclosed embodiments.

Referring to FIG. 4, response system 106 includes memory 430 including one or more memory units, as described above. One or more software sections or modules of memory 430 can be integrated into a computer system, non-transitory computer-readable media, or existing communications software. The programs, modules, or code can also be implemented or replicated as firmware or circuit logic.

Memory 430 may include programs to authenticate a user, create or edit a user profile, determine a vehicle mode, set a vehicle mode, monitor vehicle operations, limit vehicle operations, send and receive data, display a message, play a message, perform an authentication process, create or edit a user profile, determine a vehicle mode, set a vehicle mode, and/or other functions consistent with disclosed embodiments. In some embodiments, memory 430 includes one or more programs disclosed in reference to memory 240 of vehicle system 102.

As shown in FIG. 4, memory 430 includes communication module 432 and vehicle management module 434. Communication module 432 includes programs and scripts to connect with, for example, network 112, as well as protocols and communication standards to open and maintain connections to network 112. In some embodiments, communication module 432 is configured to receive data, phone calls, text messages, short message service (SMS) messages, or other communications. Communication module 432 may be configured to send messages, send data, or place automated phone calls based on instructions received from vehicle management module 434. Communication module 432 is configured to send and receive data to and from at least one of vehicle system 102, user device 104, emergency system 108, and remote device 110.

Vehicle management module 434 includes programs, scripts, or functions written in a programming language that, when executed by a processor, cause response system 106 to perform operations consistent with disclosed embodiments. For example, vehicle management module 434 may include operations to perform some or all steps to create or edit a user profile, authenticate a user, determine a vehicle mode, send instructions to set a vehicle mode, transmit data, and/or receive data.

Vehicle management module 434 may include data, programs, and functions for performing operations consistent with disclosures referring to FIG. 12, described below. Briefly, vehicle management module 434 performs operations to receive data from at least one of vehicle system 102, user device 104, or emergency system 108; identify a stored response protocol based on the received data; determine whether user input is needed based on the identified response protocol; optionally receive user input data; determine a response based on the received data and the identified response protocol, and, optionally, further based on user input data, send data to at least one of vehicle system 102, user device 104, emergency system 108, and remote device 110.

In some embodiments, vehicle management module 434 includes operations for performing some or all steps of an authentication process. The authentication process may include initiating an authentication process, requesting authentication data; receiving authentication data, validating authentication data, and identifying a vehicle mode. For example, vehicle management module may transmit data to and receive data from at least one of vehicle system 102, user device 104, or remote device 110 to perform steps of an authentication process.

Figure 5:
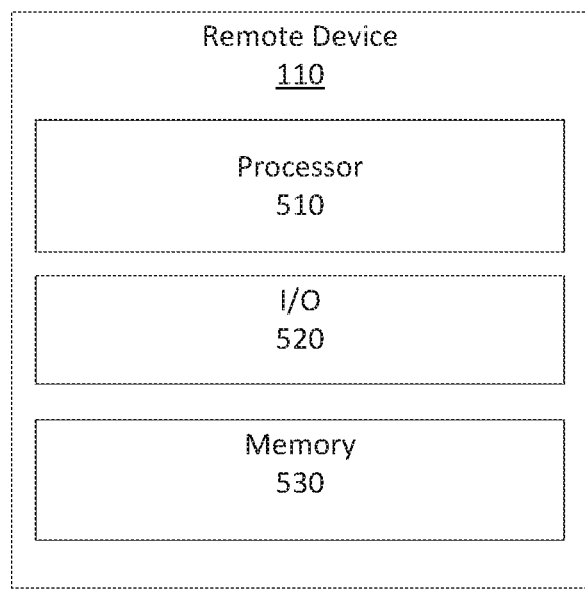
FIG. 5 is a diagram of an exemplary remote device, consistent with disclosed embodiments

FIG. 5 is a diagram of exemplary remote device 110, consistent with disclosed embodiments. Remote device 104 may be a mobile device, a s artphone, a tablet, a personal computer, a specialized device configured to perform methods according to disclosed embodiments, or the like. As shown, remote device 110 includes one or more processors 510, I/O devices 520, and one or more memory units 530.

Processors 510 may include known computing processors, as described above. One of ordinary skill in the art would understand that other types of processor arrangements could be implemented that provide for the capabilities disclosed herein. The disclosed embodiments are not limited to any type of processor(s) configured in remote device 110. Processor 510 may execute various instructions stored in memory 530 to perform various functions of the disclosed embodiments described in greater detail below. Processor 510 is configured to execute instructions written in one or more programming languages.

I/O devices 520 may include at least one of a display, an LED, a touchscreen, a keyboard, a mouse, a microphone, a speaker, a haptic device, a camera, a button, a dial, a switch, a knob, a GPS sensor, an accelerometer, a magnetometer, a transceiver, or another I/O device to perform methods of the disclosed embodiments. I/O device 520 may be embedded components of remote device 110 or stand-alone devices communicatively coupled to remote device 110.

As shown in FIG. 5, remote device 110 includes memory 530 including one or more memory units as described above. One or more software sections or modules of memory 530 can be integrated into a computer system, non-transitory computer-readable media, or existing communications software. The programs, modules, or code can also be implemented or replicated as firmware or circuit logic.

Memory 530 may include instructions which when executed on a processor perform operations such as authenticating a user, creating or editing a user profile, determining a vehicle mode, setting a vehicle mode, monitoring vehicle operations, limiting vehicle operations, sending and receiving data, displaying a message, playing a message, and/or other functions consistent with disclosed embodiments. In some embodiments, memory 430 includes one or more programs disclosed in reference to memory 240 of vehicle system 102.

Figure 6A:
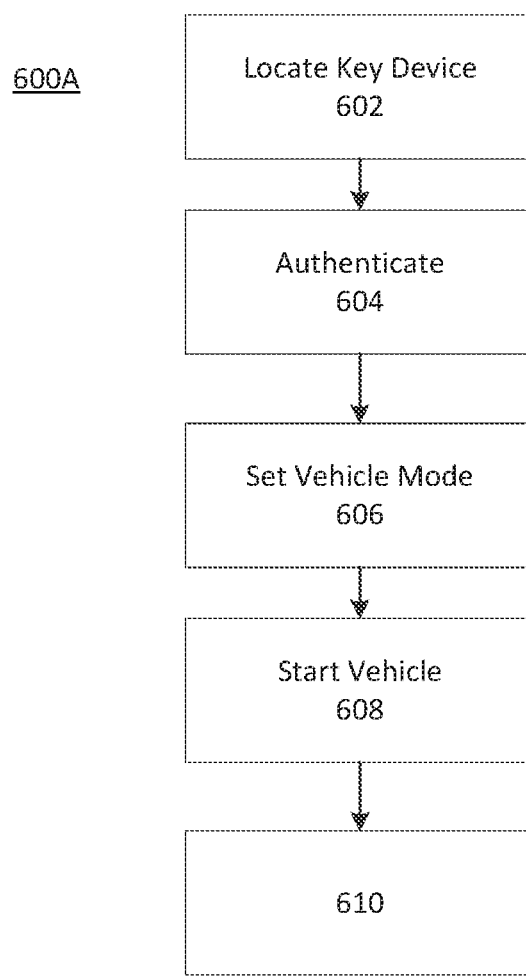
FIG. 6A is a flowchart of an exemplary process for multifactor authentication for vehicle operation, consistent with disclosed embodiments.

FIG. 6A is a flowchart of exemplary process 600A for multifactor authentication for vehicle operation, consistent with disclosed embodiments. In some embodiments, all steps of process 600A are performed by vehicle system 102. In some embodiments, one or more steps of process 600A is performed wholly or partially by at least one of user device 104, response system 106, or remote device 110.

As shown in FIG. 6A, process 600A begins at step 602, locating a key device. In some embodiments, the key device of step 602 is a traditional, physical key, and step 602 includes determining that the key has been inserted into an ignition mechanism. In some embodiments, the key device is an electronic key device (e.g., a key fob) configured to communicate with vehicle system 102, and step 602 includes determining that the key device is located inside a vehicle or near a vehicle based on a signal received from the key device. In some embodiments, vehicle system 102 determines a location of the key device based on input data from one or more input devices 220.

In some embodiments, step 602 is performed continuously or periodically throughout process 600A and processes 600B, 700, and 800. If, for example, vehicle system 102 determines that a key is no longer located inside a vehicle based on continuous or periodic performance of step 602, vehicle system 102 may disable a vehicle.

At step 604, an authentication process is performed. The authentication process may include initiating an authentication process, requesting authentication data; receiving authentication data, validating authentication data, and identifying a vehicle mode. The vehicle mode may be based on the authentication data, a user profile, or vehicle instructions. In some embodiments, the vehicle mode is one of an "unrestricted mode," a "restricted mode," an "emergency mode," a "supervised mode," an "erratic driver mode," or an "unresponsive driver mode."

In some embodiments, step 602 and step 604 are completed before a user is granted access to a vehicle. For example, a use may be unable to unlock a vehicle door prior to successful completion of step 604.

Step 606 includes setting a vehicle mode. For example, vehicle mode module 244 may set restriction criteria or send commands to one or more I/O devices 220 to limit vehicle operations. At step 606, at least one of vehicle mode module 244 or user device 104 may display a notification, play a notification on a speaker, provide haptic feedback, change a vehicle condition indicator, or otherwise provide information to a vehicle occupant, the information relating to the vehicle mode.

At step 608, the vehicle is started, based on the authentication and the vehicle mode. In some embodiments, starting a vehicle includes energizing a vehicle ignition.

In some embodiments, step 610, as described below in reference to FIG. 6B, follows step 608.

In some embodiments, process 600A includes a step (not depicted) to transmit a message to one of response system 106, emergency system 108, or remote device 110. The message may include information identifying the vehicle mode or a user profile.

In some embodiments, all steps of process 600A may be performed by vehicle system 102. However, as one of skill in the art will appreciate, in some embodiments, some steps of process 600A are performed by vehicle system 102, while other steps of the process of FIG. 6A are performed by at least one of user device 104, response system 106, or remote device 110.

Figure 6B:
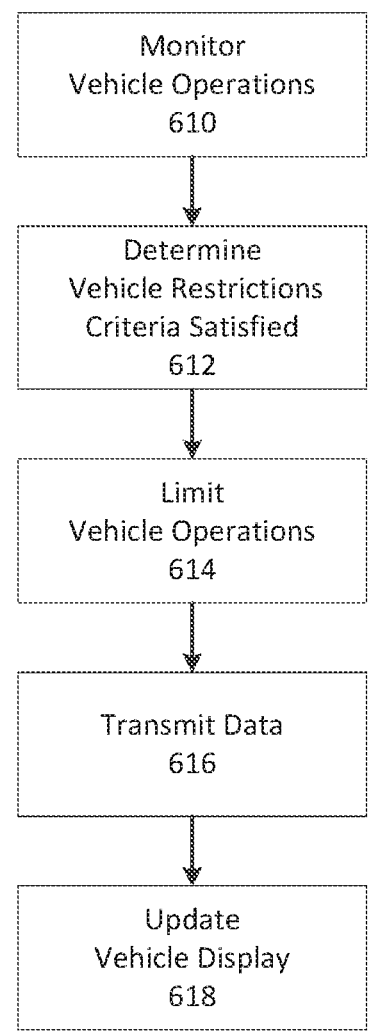
FIG. 6B is a flowchart of an exemplary process for limiting vehicle operations, consistent with disclosed embodiments.

FIG. 6B is a flowchart of exemplary process 600B for limiting vehicle operations, consistent with disclosed embodiments. Process 600B is a continuation of process 600A. In some embodiments, all steps of process 600B are performed by vehicle system 102. In some embodiments, one or more steps of process 600B is performed wholly or partially by at least one of user device 104, response system 106, or remote device 110.

As shown in FIG. 6B, at step 610, vehicle system 102 monitors vehicle operations, consistent with disclosed embodiments. Step 610 includes receiving monitoring data at vehicle mode module 244. In some embodiments, step 610 includes monitoring at least one of a vehicle location, a vehicle speed, engine information, braking information, or a vehicle condition. The vehicle condition may include at least one of a vehicle fuel level, an oil level, a battery level, a tire pressure, a temperature, a seat belt usage, or another vehicle condition. As one of skill in the art may appreciate, step 610 may be performed continuously or periodically.

Step 612 includes determining whether vehicle restriction criteria are satisfied, consistent with disclosed embodiments. Step 612 includes comparing monitoring data received at step 610 with restriction criteria associated with a vehicle mode. For example, step 612 may include comparing current and/or historic monitoring data with restriction criteria. In some embodiments, step 612 includes comparing a vehicle speed to a maximum speed or comparing a vehicle location to a geographic boundary or a maximum distance to determine whether restriction criteria are satisfied. As one of skill in the art will appreciate, step 612 may include still other comparisons.

Next, step 614 includes limiting vehicle operations based on the determination of step 612. In some embodiments, step 614 includes at least one of limiting a vehicle speed, lowering a vehicle speed, stopping a vehicle, preventing a vehicle from moving, limiting a vehicle acceleration, turning a vehicle off, switching a vehicle to an autonomous driving mode, or the like.

Step 616 includes transmitting data to at least one of remote system 106, emergency system 108, or remote device 110. The transmitted data of step 616 may include monitoring data or restriction criteria. For example, in some embodiments, step 616 includes sending vehicle monitoring data including at least one of a vehicle location, a vehicle speed, engine information, braking information, or a vehicle condition. In some embodiments, the transmitted data of step 616 comprises data from at least one of I/O devices 220 (e.g., microphone 221 and camera 222). Step 616 may include sending a message involving restriction criteria. For example, step 616 may include transmitting a notification that a speed and/or distance threshold has been reached. Step 616 may include transmitting a notification that a geographic boundary has been reached or is near to a vehicle. In some embodiments, step 616 is performed if step 612 determines that vehicle restriction criteria are satisfied. In some embodiments, step 616 is performed if step 612 determines that vehicle restriction criteria are not satisfied.

As shown in FIG. 6B, step 618 includes displaying information on a vehicle display or otherwise providing information to a vehicle occupant via at least one of I/O devices 220. In some embodiments, displaying information at step 618 includes displaying a notification or playing a notification. The notification may include a warning that restriction criteria have been satisfied or another message involving restriction criteria. For example, the notification may include information that a vehicle is approaching a geographic boundary in which vehicle operations will be limited. As an example, step 618 may include displaying information indicating the distance remaining until a distance threshold is reached. In some embodiments, step 618 includes causing a vehicle condition indicator to display a false vehicle condition. In some embodiments, step 618 is performed if step 612 determines that vehicle restriction criteria are satisfied. In some embodiments, step 618 is performed if step 612 determines that vehicle restriction criteria are not satisfied.

As one of skill in the art will appreciate, in some embodiments at least one of steps 614, step 616, or step 618 is skipped.

Figure 7:
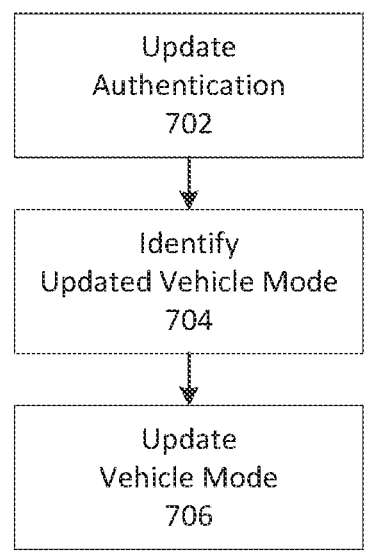
FIG. 7 is a flowchart of an exemplary process for limiting vehicle operations, consistent with disclosed embodiments.

FIG. 7 is a flowchart of exemplary process 700 for limiting vehicle operations, consistent with disclosed embodiments. Process 700 is a sub-process of processes 600A or 600B. That is, process 700 may be performed at any time while performing steps including process 600A or process 600B. Process 700 may be performed more than one time.

In some embodiments, all steps of process 700 are performed by vehicle system 102. In some embodiments, one or more steps of process 700 is performed wholly or partially by at least one of user device 104, response system 106, or remote device 110.

In some embodiments, process 700 is performed to change a vehicle mode from an unrestricted vehicle mode to a restricted vehicle mode (e.g., an emergency mode). Process 700 may be performed to change a vehicle mode from a restricted vehicle mode (e.g., a valet mode) to an unrestricted vehicle mode. In some embodiments, process 700 is performed to change a vehicle mode from one restricted mode to another restricted mode. For example, process 700 may be performed to change a vehicle mode from a supervised mode to an emergency mode.

As shown in FIG. 7, step 702 includes performing an authentication process to update an authentication. For example, after completing an authentication at step 604, or after starting a vehicle at step 608, or at any other point in processes 600A or 600B, step 702 may be performed to update an authentication. Step 702 includes an authentication process. The authentication process may include initiating an authentication process; requesting authentication data; receiving authentication data; and validating authentication data. Step 702 may include methods disclosed in reference to authentication module 242.

In some embodiments, step 702 is performed upon receiving input data via, for example, one of I/O devices 220, I/O devices 320, I/O devices 420, or I/O devices 520. For example, step 702 includes receiving a request to initiate an authentication process. Step 702 may include receiving, by vehicle mode module 244, a biometric, a pass code, a tap code, a voice signal including a key phrase, or other input data. Step 702 may include receiving input data from a button, a switch, a dial, a keypad, a pedal, or another input device. Step 702 may include continuously receiving and processing audio inputs from a microphone located inside a vehicle to detect a pre-defined key phrase corresponding to a vehicle mode including, for example, an unrestricted mode or an unrestricted mode.

Step 704 includes identifying a vehicle mode based on the authentication. In some embodiments, step 704 may include comparing authentication data to stored user profiles and determining the vehicle mode based on the comparison.

As shown in FIG. 7, step 706 includes updating a vehicle mode. For example, at step 706, vehicle mode module 244 may set restriction criteria or send commands to one or more I/O devices 220 to limit vehicle operations. At step 706, at least one of vehicle mode module 244 or user device 104 may display a notification, play a notification on a speaker, provide haptic feedback, change a vehicle condition indicator, or otherwise provide information to a vehicle occupant, the information relating to the vehicle mode.

Figure 8:
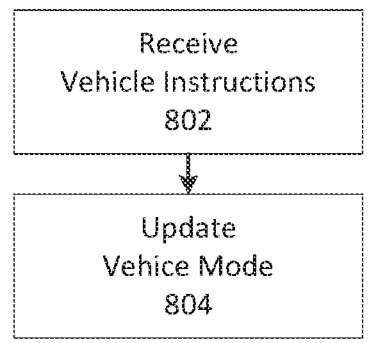
FIG. 8 is a flowchart of an exemplary process for limiting vehicle operations, consistent with disclosed embodiments.

FIG. 8 is a flowchart of exemplary process 800 for limiting vehicle operations, consistent with disclosed embodiments. Process 800 is a sub-process of processes 600A or 600B. That is, process 800 may be performed at any time while performing steps including process 600A or process 600B. Process 800 may be performed more than one time.

In some embodiments, all steps of process 800 are performed by vehicle system 102. In some embodiments, one or more steps of process 800 is performed wholly or partially by at least one of user device 104, response system 106, or remote device 110.

As shown in FIG. 8, step 802 includes receiving vehicle instructions from one of response system 106 or remote device 110. In some embodiments, the vehicle instructions include instructions to update a vehicle mode, to limit vehicle operations, and/or to update restriction criteria of a vehicle mode. In some embodiments, vehicle instructions are received in response to vehicle data sent to one of response system 106 or remote device 110 at, for example, step 616.

Step 804 includes updating a vehicle mode based on vehicle instructions received at step 802. At step 804, vehicle mode module 244 may set restriction criteria or send commands to one or more I/O devices 220 to limit vehicle operations. At step 804, at least one of vehicle mode module 244 or user device 104 may display a notification, play a notification on a speaker, provide haptic feedback, change a vehicle condition indicator, or otherwise provide information to a vehicle occupant, the information relating to the vehicle mode.

Figure 9:
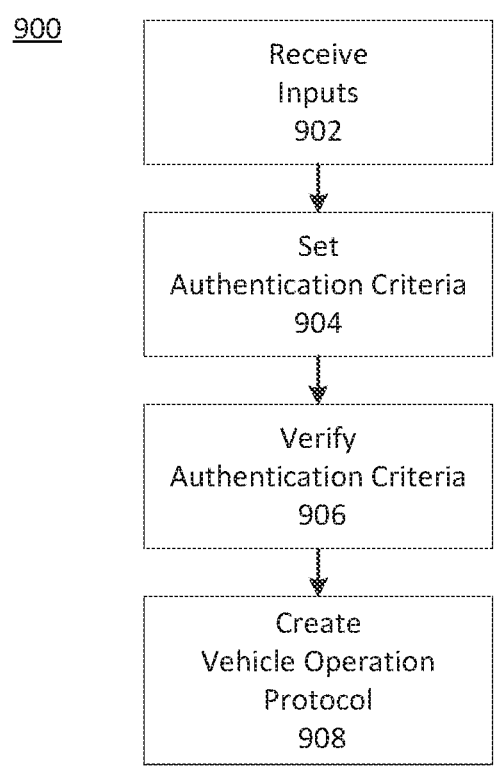
FIG. 9 is a flowchart of an exemplary process for creating a user profile, consistent with disclosed embodiments.

FIG. 9 is a flowchart of exemplary process 900 for creating a user profile including authentication data, vehicle mode data, and a vehicle operation protocol, consistent with disclosed embodiments. All or some steps of process 900 may be performed by vehicle system 102. In some embodiments, all or some steps of process 900 are performed by at least one of user device 104, response system 106, or remote device 110.

Step 902 includes receiving inputs from, for example, I/O devices 220, 320, 420, or 520. Inputs may include data identifying a user. In some embodiments, received inputs at step 902 include biometric data, including voice recognition data, retinal scan data, face recognition data, handprint data, fingerprint data, or other biometric data. Inputs may include data associated with a vehicle mode or a vehicle operation protocol.

As shown in FIG. 9, step 904 includes setting authentication criteria associated with a user profile or a vehicle authentication mode. In some embodiments, step 904 may include creating a first rule that a first vehicle mode corresponds to a first authentication process associated with first authentication criteria; e.g., a restricted mode may correspond to entry of a passcode received at step 902. In this example, the passcode may be shared by multiple users. Further, in some embodiments, step 904 may include creating a second rule that a second mode corresponds to a second authentication process associated with second authentication criteria; e.g., an unrestricted mode may correspond to successfully completing a voice recognition or face recognition process. In this example, the authentication criteria may be unique to a single user. As one of skill in the art will appreciate, step 904 may include setting other authentication criteria by creating other rules.

Step 906 includes verifying authentication criteria. In some embodiments, verifying authentication criteria includes successfully reproducing criteria provided at step 902. For example, a user may be prompted to re-enter a passcode, or to provide biometric data a second time, or the like. In some embodiments, step 906 includes sending a message to at least one of response system 106 or remote device 110 and receiving confirmation that the authentication criteria received at step 904 are verified. For example, step 906 may include a two-step authentication process.

Step 908 includes creating a vehicle operation protocol associated with a vehicle mode based on input received at step 902, consistent with disclosed embodiments. The vehicle operation protocol may include vehicle restriction criteria including, for example, a maximum vehicle speed, a distance threshold, or a geographic boundary. The vehicle operation protocol of step 908 may include instructions for limiting vehicle operations. For example, the vehicle operation protocol may include instructions to limit vehicle speed, turn a vehicle on or off, or otherwise limit vehicle operations. The vehicle operation protocol may include instructions to set a vehicle in an autonomous driving mode and may further include instructions to travel to a destination in the autonomous driving mode. The vehicle operation protocol of step 908 may include instructions to simulate an engine failure.

Figure 10:
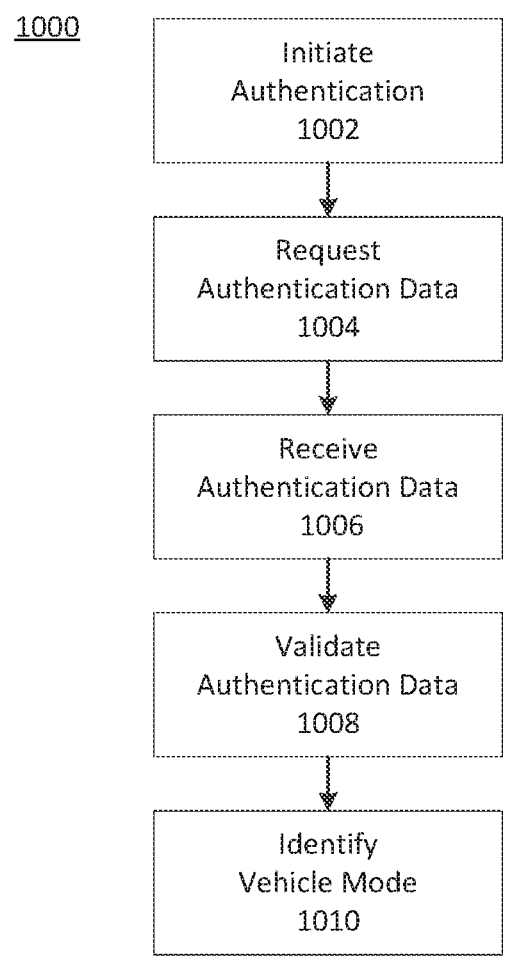
FIG. 10 is a flowchart of an exemplary process for authenticating a user, consistent with disclosed embodiments.

FIG. 10 is a flowchart of exemplary process 1000 for authenticating a user, consistent with disclosed embodiments. All or some steps of process 1000 may be performed by vehicle system 102 (e.g., via authentication module 242). In some embodiments, all or some steps of process 1000 are performed by at least one of user device 104, response system 106, or remote device 110.

At step 1002, an authentication process is initiated. For example, vehicle system 102 may receive input data from one of I/O devices 220, the data including a request to initiate an authentication process.

At step 1004, authentication data is requested. For example, one of vehicle system 102 or user device 104 may be display or announce a request to enter authentication data (e.g., via display 226 or speaker 225). In some embodiments, step 1004 is skipped and a user provides authentication data received at step 1006 without a request.

At step 1006, authentication data is received. In some embodiments, receiving authentication data includes receiving input data from a button, a switch, a dial, a touch screen, a microphone, a camera, a scanner, a keypad, a pedal, or another input device. In some embodiments, authentication data includes biometric data including, for example, retinal scan data, fingerprint data, hand data, voice recognition data, or face recognition data. Authentication data may include a passcode, a tap pattern, a key phrase, or other data.

As shown in FIG. 10, step 1008 includes validating authentication data. In some embodiments, validating authentication data includes successfully reproducing data inputs received at step 1006. For example, a user may be prompted to re-enter a passcode, or to provide biometric data a second time, or the like. In some embodiments, step 1008 includes sending a message to at least one of response system 106 or remote device 110 and receiving confirmation that the authentication criteria received at step 1006 are valid. For example, step 1008 may include a two-step authentication process.

Step 1010 includes identifying a vehicle mode based on the validated authentication process. In some embodiments, the vehicle mode includes restriction criteria and vehicle operation protocols for limiting vehicle operations. In some embodiments, step 1010 includes comparing authentication data received at step 1004 with stored user profiles to identify a corresponding vehicle mode.

Figure 11:
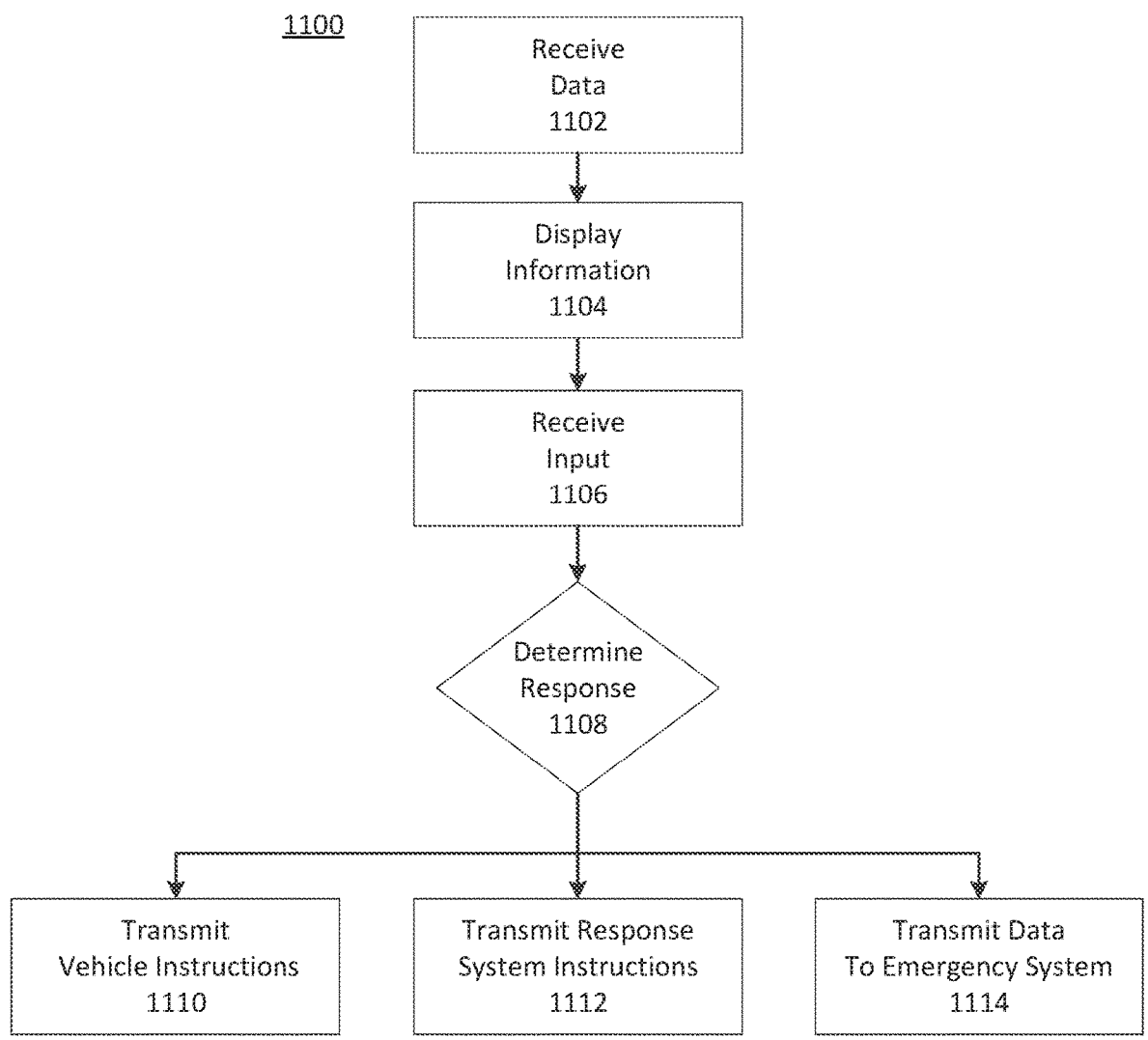
FIG. 11 is a flowchart of an exemplary process at a remote user device for responding to received data.

FIG. 11 is a flowchart of exemplary process 1100 at a remote user device for responding to received data. In some embodiments, process 1100 is performed by functions stored in memory 530.

As shown in FIG. 11, process 1100 begins at step 1102 by receiving data from one of vehicle system 102, user device 104, or response system 106. Data received at step 1102 may include vehicle monitoring data such as, for example vehicle location, vehicle speed, engine information, braking information, vehicle condition, or operating state of the vehicle. Step 1102 may include receiving a message involving restriction criteria. For example, step 1102 may include receiving a notification that a speed and/or distance threshold has been reached. Step 1102 may include receiving a notification that a geographic boundary has been reached or is near to a vehicle. As an example, at step 1102, remote user device 110 may be located at a restaurant, and a notification may be received that a vehicle in "valet mode" has been driven at a speed exceeding a threshold. As another example, at step 1102, remote user device 110 may receive a request for a user (e.g., a parent) to enter data part of an authentication of "supervised mode" that would allow another user (e.g., a child) to start a vehicle. As yet another example, at step 1102, remote user device 110 may receive a notification that a vehicle is now in an "emergency mode." As one of skill in the art will appreciate, the examples are illustrative only and not exhaustive or limiting on the embodiments.

Next, step 1104 includes displaying information on remote device 110, the information being based on data received at step 1102. In some embodiments, step 1104 includes providing a notification, including providing haptic feedback and/or playing a sound on a speaker. For example, remote user device 110 may display a "badge" or a "banner," or remote user device 110 may vibrate.

Step 1106 includes receiving input data in response to step 1104. For example, a user may provide parameters of vehicle instructions or response system instructions to be sent following step 1108. A user may provide authentication data based on information displayed at step 1104.

Next, step 1108 includes determining a response based on input data received at step 1106 and data received at step 1102. Step 1108 may include determining whether to perform step 1110 (transmit vehicle instructions to at least one of vehicle system 102 or user device 104), step 1112 (transmit response system instructions to response system 108), and/or step 1114 (transmit data to emergency system 108). The determination of step 1106 may be based on a vehicle mode and a vehicle operation protocol, consistent with disclosed embodiments.

Step 1110 includes transmitting vehicle instructions to at least one of vehicle system 102 or user device 104, consistent with disclosed embodiments. The vehicle instructions of step 1110 may include instructions to update a vehicle mode, to limit vehicle operations, or to update restriction criteria of a vehicle mode.

Step 1112 includes transmitting response system instructions to response system 108. The response system instructions of step 1112 may include, for example, instructions to provide data to remote device 110; instructions to request data from at least one of vehicle system 102 or user device 104; or a command to send vehicle instructions to at least one of vehicle system 102 or user device 104.

Step 1114 includes transmitting data to emergency system 108. Step 1114 may include placing a phone call. Step 1114 may include sending a notification that a vehicle is an emergency mode, that a user is in an unresponsive state, that an erratic driving pattern has been identified, or that restriction criteria are satisfied.

Figure 12:
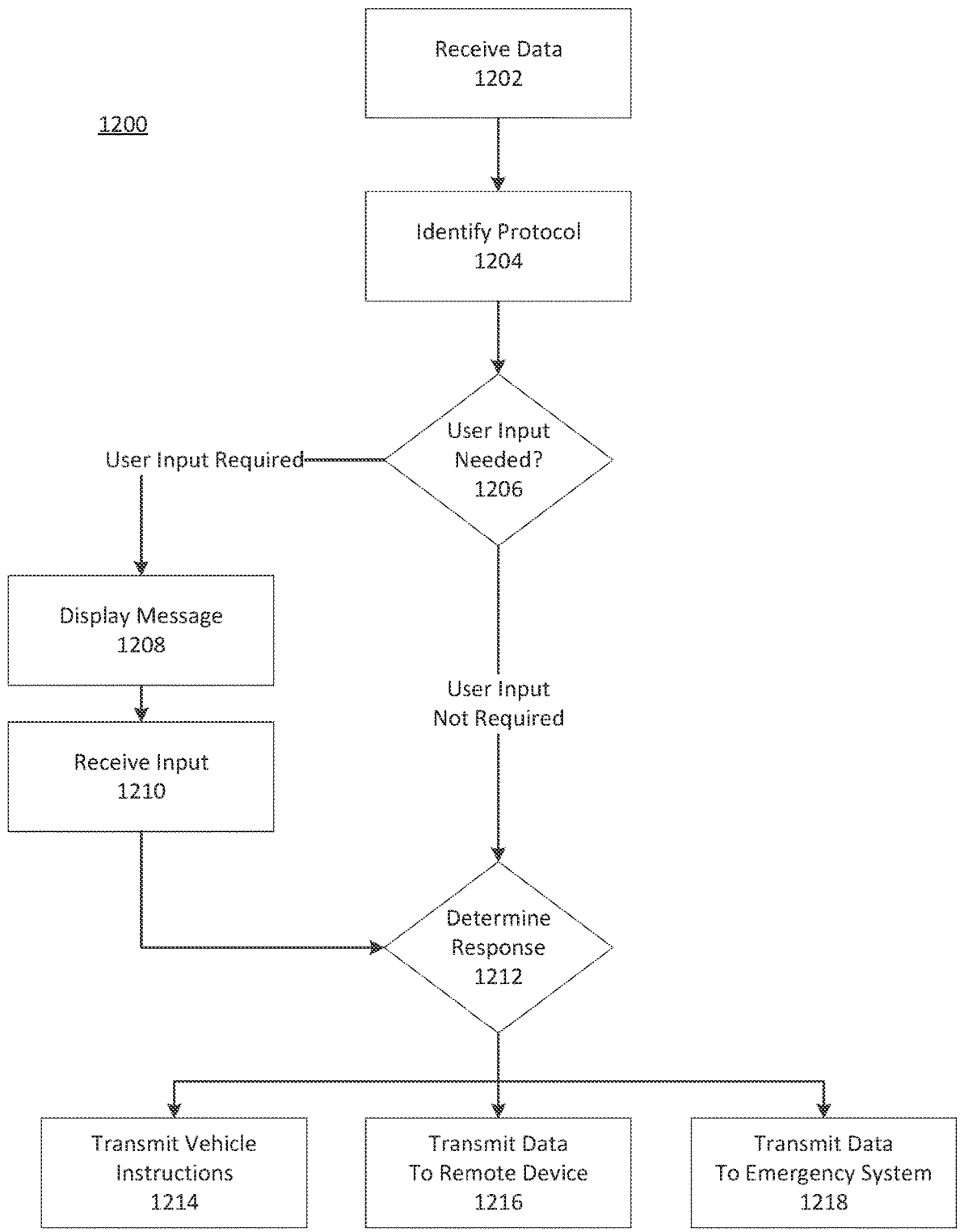
FIG. 12 is a flowchart of an exemplary process at a response system for responding to received data.

FIG. 12 is a flowchart of exemplary process 1200 at a response system for responding to received data. In some embodiments, process 1200 is performed by vehicle management module 434.

Process 1200 begins at step 1202 by receiving data at vehicle management module 434 from at least one of vehicle system 102, user device 104, or remote device 110. Received data may include a vehicle mode, a vehicle location, a vehicle speed, a vehicle condition, sensor data, or other data, consistent with disclosed embodiments. For example, the received data may include information that a vehicle in a "supervised mode" has crossed a geographic boundary (e.g., the boundary may be a 25-mile radius around a home, and a child may have driven a car past the boundary). As another example, the received data may include information that a vehicle in "valet mode" has exceeded a speed of 80 mph. As yet another example, the received data may include information that a vehicle is in an "emergency mode" after the vehicle has been carjacked. As one of skill in the art will appreciate, the examples are illustrative only and not exhaustive or limiting on the embodiments.

At step 1204, vehicle management module 434 identifies a response protocol based on the received data. The response protocol includes instructions for responding to the received data including instructions to send notifications, to send vehicle instructions, to request additional data, or other instructions. The protocol may be identified based on a comparison of received data to reference data (e.g., driving statistics for a location, current traffic conditions, historical data associated with the vehicle, or other reference data).

Step 1206 includes determining whether user input is required. In some embodiments, the identified protocol specifies that user input is required. For example, it may be that human judgment is needed to determine whether received data at step 1202 indicate a bona fide emergency or another situation. In some embodiments, user input may be required because the protocol does not specify a response corresponding to the received input data.

At optional step 1208, performed if it is determined that user input is required, vehicle management system 434 displays a message at one of I/O devices 420. In some embodiments, vehicle management system prompts a user to call, for example, user device 104 or remote device 110 to receive additional information or instructions. As one of skill in the art will appreciate, step 1208 may include displaying still other messages.

At step 1210, vehicle management module 434 receives user input data. The data may include instructions or other commands.

Step 1212 includes determining a response, such as, for example, determining whether to perform step 1214 (transmit vehicle instructions to at least one of vehicle system 102 or user device 104), to perform step 1216 (transmit data to remote device 110), and/or to perform step 1216 (transmit data to emergency system 108). The determination of step 1212 may be based on input data received at step 1202, the protocol identified at step 1204, and, optionally, based on input received at step 1210, consistent with disclosed embodiments.

Step 1214 includes transmitting vehicle instructions to at least one of vehicle system 102 or user device 104, consistent with disclosed embodiments. The vehicle instructions of step 1214 may include instructions to update a vehicle mode, to limit vehicle operations, or to update restriction criteria of a vehicle mode.

Step 1216 includes transmitting data to remote device 1216. The transmitted data of step 1112 may include, for example, instructions to provide data to response system 106, instructions to request data form at least one of vehicle system 102 or user device 104, or a command to send vehicle instructions to at least one of vehicle system 102 or user device 104.

In some embodiments, step 1216 includes transmitting vehicle monitoring data including at least one of a vehicle location, a vehicle speed, engine information, braking information, or a vehicle condition. Step 1216 may include sending a message involving restriction criteria. For example, step 1216 may include transmitting a notification that a speed and/or distance threshold has been reached. Step 1216 may include transmitting a notification that a geographic boundary has been reached or is near to a vehicle.

Step 1218 includes transmitting data to emergency system 108. Step 1218 may include placing a phone call. Step 1218 may include sending a notification that a vehicle is an emergency mode, that a user is in an unresponsive state, that an erratic driving pattern has been identified, or that restriction criteria is satisfied.

Systems and methods disclosed herein involve unconventional improvements over conventional vehicle operation systems. As compared to conventional technologies, the disclosed embodiments may improve vehicle security and ability to manage or limit vehicle operations for multiple drivers.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for limiting operation of a vehicle, comprising:
one or more memory units for storing instructions; and
one or more processors configured to execute the instructions to perform operations comprising:
creating a first user profile associated with the vehicle, the first user profile comprising a first user vehicle mode and first user authentication data comprising a first user voice signal;
determining that a key device is inside the vehicle;
scanning to detect a first user device;
connecting to the first user device;
transmitting a request for authentication data to the first user device, the transmitting being based on the determination that the key device is inside the vehicle;
receiving, based on the request, first input authentication data from the first user device, the first input authentication data comprising a first input voice signal captured by the first user device in response to a first prompt provided by the first user device;
determining that a component of the input voice signal matches the first user voice signal;
setting the vehicle mode to the first user vehicle mode based on the determination that that the first input voice signal matches the first user voice signal;
limiting vehicle operation based on the first user vehicle mode;
receiving data comprising at least one of a vehicle mode, vehicle location, a vehicle speed, a vehicle condition, or sensor data;
identifying a response protocol based on the received data; and
determining whether user input is required based on the identified response protocol.

2. The system of claim 1, wherein the first user vehicle mode comprises at least one of operating the vehicle below a maximum vehicle speed or operating the vehicle for a distance below a distance threshold.

3. The system of claim 2, wherein limiting vehicle operation comprises:
determining that a vehicle travel distance exceeds the distance threshold;
sending a notification to a remote user device, the notification stating that the vehicle travel distance exceeds the distance threshold; and
performing, based on the vehicle travel distance and the distance threshold, at least one of decreasing vehicle speed or disabling the vehicle.

4. The system of claim 3, wherein limiting vehicle operation comprises:
displaying a notification, the notification comprising an instruction to cease vehicle operation;
initiating a delay period; and
upon expiration of the delay period, modifying operation of the vehicle by one of reducing vehicle speed or disabling the vehicle.

5. The system of claim 1, wherein
the operations further comprise:
determining that a predetermined condition of the first user vehicle mode is satisfied; and
sending a description of a vehicle location to a remote device, based on a determination that the predetermined condition is satisfied.

6. The system of claim 5, wherein the predetermined condition comprises at least one of reaching a scheduled time, reaching a predetermined location, leaving a predetermined location, exceeding a predetermined speed, or detecting an emergency input.

7. The system of claim 1, wherein the first user authentication data further comprises at least one of a passcode, a tap code, or a biometric.

8. The system of claim 1, wherein:
the first user vehicle mode is an emergency mode; and
the first user voice signal comprises an emergency phrase.

9. The system of claim 1, wherein the operations further comprise:
creating a second user profile associated with the vehicle, the second user profile comprising a second user vehicle mode and second user authentication data;
receiving third input authentication data;
determining that the third input authentication data matches the second user authentication data; and
setting the vehicle mode to the second user vehicle mode.

10. The system of claim 9, wherein the operations further comprise:
scanning to detect a second user device; and
connecting to the second user device;
transmitting a request for the third input authentication data to the second user device; and
receiving the third input authentication data from the second user device.

11. The system of claim 9, wherein:
the second user vehicle mode is an emergency mode;
the second user profile comprises an emergency phrase; and
receiving the third input authentication data comprises:
monitoring an audio input signal; and
identifying the emergency phrase in the audio input signal.

12. The system of claim 11, the operations further comprise:
sending a notification to an emergency service.

13. The system of claim 9, wherein:
the first vehicle mode is a restricted mode; and
the second vehicle mode is an unrestricted mode.

14. The system of claim 9, wherein:
the first vehicle mode is an unrestricted mode; and
the second vehicle mode is a restricted mode.

15. The system of claim 10, wherein the operations further comprise:
turning the vehicle on based on the determination that the first input authentication data matches the first user authentication data.

16. The system of claim 10, wherein the request comprises at least one of an audio prompt or a visual prompt.

17. The system of claim 10, wherein:
the request comprises an instruction to look at a camera; and
determining that the third input authentication data matches the second user authentication data comprises implementing a facial recognition algorithm.

18. A method for limiting vehicle operation, the method comprising:
creating a first user profile associated with the vehicle, the first user profile comprising a first user vehicle mode and first user authentication data comprising a first user voice signal;

determining that a key device is inside the vehicle;
scanning to detect a first user device;
connecting to the first user device;
transmitting a request for authentication data to the first user device based on the determination that the key device is inside the vehicle;
receiving, based on the request, first input authentication data from the first user device, the first input authentication data comprising a first input voice signal captured by the first user device in response to a first prompt provided by the first user device;
determining that a component of the input voice signal matches the first user voice signal;
setting the vehicle mode to the first user vehicle mode based on the determination that the first input voice signal matches the first user voice signal; and
limiting vehicle operation based on the first user vehicle mode;
receiving data comprising at least one of a vehicle mode, vehicle location, a vehicle speed, a vehicle condition, or sensor data;
identifying a response protocol based on the received data; and
determining whether user input is required.

19. A system for limiting operation of a vehicle, comprising:
one or more memory units for storing instructions; and
one or more processors configured to execute the instructions to perform operations comprising:
scanning to detect a first user device;
connecting to the first user device;
transmitting, to the first user device, a request for first authentication data;
receiving first authentication data from the first user device responsive to the request;
determining that the first authentication data matches stored authentication data associated with a supervised mode;
receiving second input authentication data from the first user device;
transmitting, to a remote user device based on the determination, a request for third authentication;
receiving, from the remote user device, third authentication data responsive to the request for third authentication;
setting the vehicle mode to the supervised mode based on the third authentication data and based on the determination that the first authentication data matches the second authentication data; and
limiting vehicle operation based on the supervised mode;
receiving data comprising at least one of a vehicle mode, vehicle location, a vehicle speed, a vehicle condition, or sensor data;
identifying a response protocol based on the received data; and
determining whether user input is required.

\* \* \* \* \*